United States Patent [19]

Laidely

[11] Patent Number: 4,846,495
[45] Date of Patent: Jul. 11, 1989

[54] SUSPENSION COMPONENT ASSEMBLY FOR A TANDEM AXLE ASSEMBLY

[76] Inventor: Peter Laidely, "Jireh" Cedar Creek Road, Cedar Creek, Australia, 4520

[21] Appl. No.: 153,581

[22] Filed: Feb. 8, 1988

[30] Foreign Application Priority Data

Feb. 9, 1987 [AU] Australia .................. PI0245

[51] Int. Cl.$^4$ .............................................. B60G 5/00
[52] U.S. Cl. .................................... 280/680; 280/676
[58] Field of Search ............... 280/676, 690, 685, 677, 280/680

[56] References Cited

U.S. PATENT DOCUMENTS

| | | | |
|---|---|---|---|
| 3,367,677 | 2/1968 | Preddy, Jr. ................ | 280/680 |
| 4,500,110 | 2/1985 | McWhorter ................ | 280/680 |
| 4,679,817 | 7/1987 | Box ........................... | 280/680 |

Primary Examiner—Richard A. Bertsch
Attorney, Agent, or Firm—Karen M. Gerken; Martin P. Hoffman; Mitchell B. Wasson

[57] ABSTRACT

A suspension component assembly including a top plate assembly for mounting relative to a spring assembly of a vehicle and a saddle. The top plate assembly having a top plate and an alignment member having locating means for accurately receiving a nib of the spring assembly. The top plate having a slot or a recess on its underside for receiving the alignment member. The recess allowing movement of the member for adjustment of squareness of an axle of the vehicle relative to the longitudinal axis of the vehicle. Adjustment means associated with the top plate allows the location and holding of the alignment member at a desired location relative to the recess.

11 Claims, 3 Drawing Sheets

SUSPENSION COMPONENT ASSEMBLY FOR A TANDEM AXLE ASSEMBLY

The invention relates to a suspension component assembly for a tandem axle assembly of the style that is made by Hendrickson MFG. Co. of Illinois, America.

A typical Hendrickson tandem axle assembly is illustrated in FIGS. 1 and 2. FIGS. 1 and 2 show a side view of such an assembly where two wheels of one transverse side of vehicle are mounted for rotation about respective axles which extend transversely of the vehicle (not shown) and at spaced longitudinal locations along the vehicle chassis rail member. Two spring hangers are located at longitudinal locations along the chassis rail. The hangers are adapted to support opposite ends of a leaf spring assembly. The forward end of the spring is held via a pin to the forward hanger while the rear end of the spring rests on a retaining bolt or pin associated with the rear hanger. A walking beam assembly extends between the fore and aft axles of each side of the assembly and terminates in beam end adapters and bushings. A medial location of the walking beam is held relative to a medial location of the leaf spring assembly by a spring saddle located on an underside of the spring assembly and a top plate assembly. The spring saddle is clamped to the spring assembly by bolts which pass through the saddle top plate situated on an upper side of the spring assembly and into the saddle. The top plate is restrained from for and aft movement by two projections of saddle back 25b which locate against machined faces of the top plate. The upper leaf of the spring assembly has an upwardly extending nib about which the top plate locates. The underside of the top plate has a circular recess slightly larger than the diameter of the nib and the nib locates in this recess. The top plate has a shoulder on its underside and on an opposed side two horizontally extending clamping screws are located and are directed towards the shoulder. The saddle has an upwardly extending back and the spring assembly is clamped between that back and the shoulder on the underside of the top plate. Thus, the spring is held against for and aft movement relative to the saddle. By tightening the clamping screws the spring assembly is clamped against the shoulder and between that shoulder and the saddle extension. The spring assembly is caused to move transversely during this clamping operation and the movement is allowed by clearance between the recess on the underside of the top plate and the nib. The spring assembly has a plurality of leaves. The top leaf, as mentioned above has a nib and centre bolt extends through the leaves and projects outwardly from the lowermost leaf. The projecting centre bolt is received in a recess in the saddle. Considerable clearance is provided between the bolt and the recess. The centre bolt is necessary to hold the leaves together prior to assembly of the suspension and does not provide any major function during service.

Some vehicle suspensions do not employ saddles with an upwardly extending projection as described above. In such suspensions, the spring assembly is not held by clamping screws but rather a pair of U bolts are employed to hold the spring assembly between a top plate and a saddle. In such suspensions the top plate does not have a shoulder on its underside.

Vehicle suspensions require adjustment to ensure that the axles of the tandem set are not only parallel with each other but also square or at right angles to the centerline or longitudinal axis of the vehicle. Misalignment of the axles either out of square or out of parallel (outside maximum specified tolerances of ⅛ degrees or 2 mm/m and 1 mm/m respectively) results in excessive tire wear and vehicle instability. Misalignment can be caused by factors such as suspension component wear, bent axles and misplacement of spring hangers. With the Hendrickson tandem axle assembly the play between the nib and recess results in undesired longitudinal relative movement between the spring assembly and the walking beam assembly and hence out of squareness of the axles relative to the longitudinal axis of the vehicle. The Hendrickson suspension had no provision for alignment adjustment.

One way of correcting for out of squareness of the axles was to bend the axles. However, if worn suspension components are replaced during periodic servicing, the axles may still be out of square but generally parallelity is maintained. Continued bending of the axle distorts the axle and is undesirable.

With the Hendrickson suspension there was a proposal for correcting for axle misalignment caused by inaccuracies of the clearance between the nib and the nib receiving recess in the top plate. In that proposal, the underside of the top plate was provided with a transversely extending slot into which was placed an accurately machined plate which was free to move transversely but not longitudinally of the top plate. The transverse movement was necessary to enable the spring to be clamped against the top plate shoulder. The plate had a minimum tolerance hole for receiving the nib. That arrangement did not provide for adjustment for any axle out of squareness which may have been caused by incorrect nib placement, incorrect spring hanger placement or inaccuracies in the machining of the top plate and saddle. In addition, it introduced an additional component which needed to be accurately machined to prevent longitudinal movement of the nib.

Another way of correcting for squareness has been proposed by Euclid Industries Inc. Euclid proposed the use of modified walking beam end adaptors referred to as an alignment adapter assembly which included an adapter shaft and cam adapters. At least one such assembly was used for each axle and thus for the tandem drive assembly two adapters were necessary. The cam adapters had an eccentric aperture for receiving ends of the shaft and the cam adapters in turn were received within apertures of a hanger bracket to which the walking beam was secured. By rotation of the cam adapters longitudinal displacement of one or both of the axles of the tandem set could be achieved. Such rotation also affects parallelity and once squareness has been achieved on one axle further alignment was necessary to re-correct parallelity. However, as a consequence of the camming action, movement was also imparted to the axle in a vertical direction and such movement is undesirable. The device Euclid proposed could be used to correct for squareness but each time beam bushes were replaced during normal servicing there was a potential for misalignment (both parallelity and squareness). Thus, as a consequence of servicing, realignment was also an additional operation required at each servicing of the walking beam assembly where that servicing operation would not normally require re-alignment if the Euclid adapter assembly was not present. The Euclid adapter assembly has done nothing to decrease misalignment problems where they occur most frequently, which is at the spring main leaf and top plate and saddle for a variety of reasons. This location is responsible for out of squareness in most cases.

It is an object of the present invention to provide a suspension component for a tandem axle assembly of the Hendrickson type which at least minimises the disadvantages referred to above.

According to one aspect of the invention, there is provided a suspension component assembly for a vehicle suspension including a top plate assembly for mounting relative to a spring assembly and saddle, said top plate assembly having a top plate and an alignment member having locating means for accurate alignment with a nib of the spring assembly, said top plate having a slot or a recess on its underside for receiving the alignment member, the recess allowing movement of the alignment member to adjust for squareness of the suspension and adjustment means associated with the top plate for locating and holding the alignment member at a desired location relative to the recess.

The top plate preferably includes a plurality of apertures through which fasteners such as bolts may pass to enable the top plate to be secured to the saddle and to hold the spring assembly between the top plate and the saddle. Preferably four apertures are present.

The top plate may include a shoulder on its underside and means for clamping or holding the spring assembly against the shoulder. The holding means preferably is located or associated with a part of the plate opposed to the shoulder. The holding means in one embodiment comprises two set screws or bolts extending from an edge of plate opposite the shoulder and directed towards the shoulder although one set screw may be used if desired.

The recess for receiving the alignment member may have any desired peripheral shape but preferably is either square or rectangular in shape. The recess preferably has a depth greater than the thickness of the alignment member although this is not essential. The recess is preferably substantially centrally located on the underside of the top plate.

The alignment member may comprise an alignment block receivable by the recess in the top plate. The alignment block may have any desired shape but preferably has a peripheral shape corresponding to the shape of the recess. Thus, where the recess is square or rectangular, the alignment block is also square or rectangular. It is particularly preferred that the block be square in shape. The block may comprise a square alignment plate for example. The alignment plate includes locating means for accurate alignment with the nib of the spring assembly. The locating means may comprise a recess in or projection extending from the alignment plate. Preferably the plate has a recess for accurately receiving the nib.

The adjustment means associated with the top plate enables the alignment plate to be located and held in a desired position relative to the recess in the top plate and in this way be selective adjustment of this relationship the tandem axles may be adjusted for squareness without the need for bending of the axles or effecting the parallelity of the axles. In one embodiment the adjustment means includes one or more fasteners which project through the top plate and into abutment with the alignment plate. More preferably, at least two fasteners project through the top plate and from opposed sides thereof to abut or engage with the alignment plate whereby selective operation of the fasteners enables the alignment plate to be located and held at a desired location relative to the recess in the top plate. In a particular embodiment four fasteners such as bolts are employed and are arranged in opposed pairs to abut or engage opposed sides of the alignment plate.

A preferred embodiment of the invention will be described with reference to the drawings in which.

Figure 1:
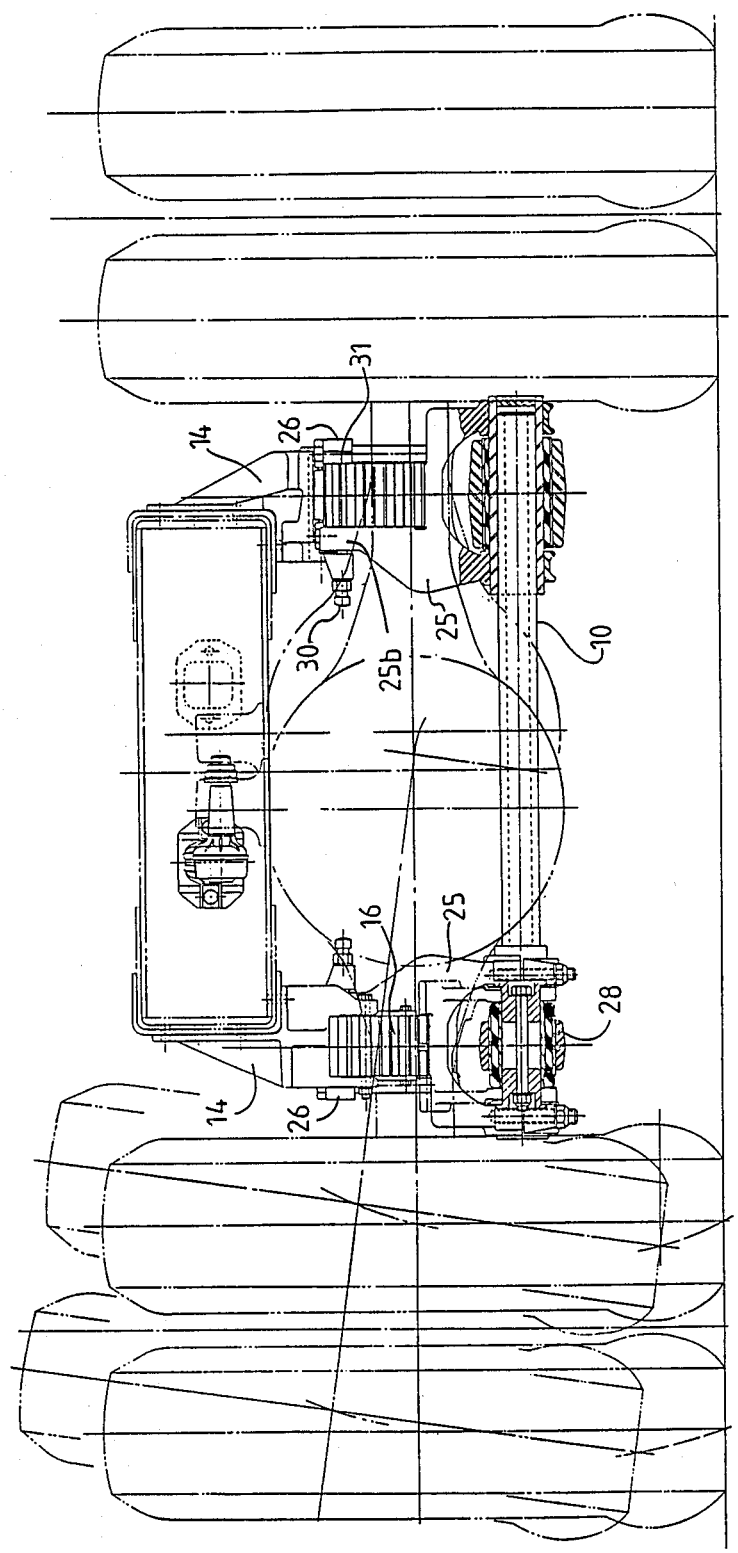
FIG. 1 is a part sectioned end view of a typical Hendrickson tandem axle assembly.
Figure 2:
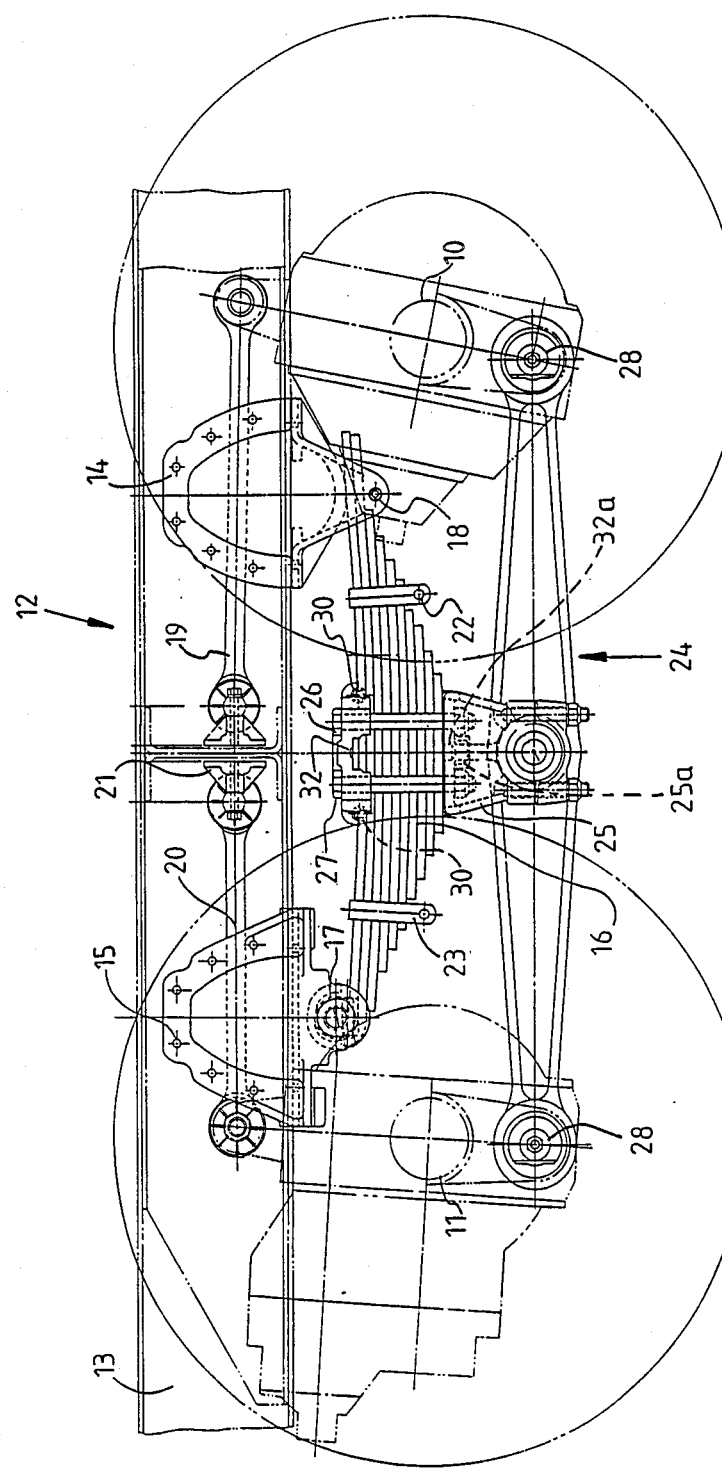
FIG. 2 is a side view of the assembly of FIG. 1.

FIGS. 1 and 2 show a typical Hendrickson tandem axle assembly having a trailing and a leading axle 10, 11 respectively. FIG. 2 only shows one side of the axle assembly. The other side which is not visible in this figure is the same in configuration. A suspension assembly 12 is mounted to opposed chassis rails 13 (only one of which is shown in FIG. 2) which extend longitudinally of a vehicle to which the tandem axle assembly belongs. Pairs of spring hangers 14, 15 located on opposed sides of the vehicle are adapted to support opposite ends of spring assemblies 16. One end of assembly 16 is mounted to hanger 15 by a pin and bush assembly 17 while the other end locates above a retaining bolt 18 and is free to move longitudinally as the assembly bends under load. The suspension assembly includes torque rods 19, 20 and a torque frame bracket 21.

Spring clamps 22, 23 extend over the leaves of the spring assembly 16. An equalizer beam of walking beam assembly 24 extends between the axles and is mounted to axles 10 and 11. Assembly 24 has a spring saddle 25 secured to it. The spring assembly 16 is held relative to the saddle 25 by a top plate 26. The spring assembly consists of a number of leaves. A nib 32 extends from an upper leaf of the assembly and a centre bolt 32a extends through the assembly and is received in a recess 25a in the saddle. From FIG. 1 it can be seen that the saddle 25 has an upwardly extending back 25b. Four fasteners 27 pass through the top plate and clamp the spring assembly 16 between the top plate 26 and saddle 25. As shown in FIG. 1 beam end adapters or bush assemblies 28 are employed to fix the walking beams to the axles. Also evident from FIG. 1 are fasteners 30 which are operative to clamp spring assemblies 16 against shoulder 31 of the top plate and between that shoulder and back 25b of the saddle. Not visible in these figures is the feature of a recess on the underside of the top plates 26. The recess may be substantially larger in diameter than the transverse width of nib 32 extending upwardly from the top leaf of the spring assembly 16. Thus, relative longitudinal movement of the axles with respect to the spring assemblies is possible and this will result in out of squareness misalignment of the axles.

Figure 3:
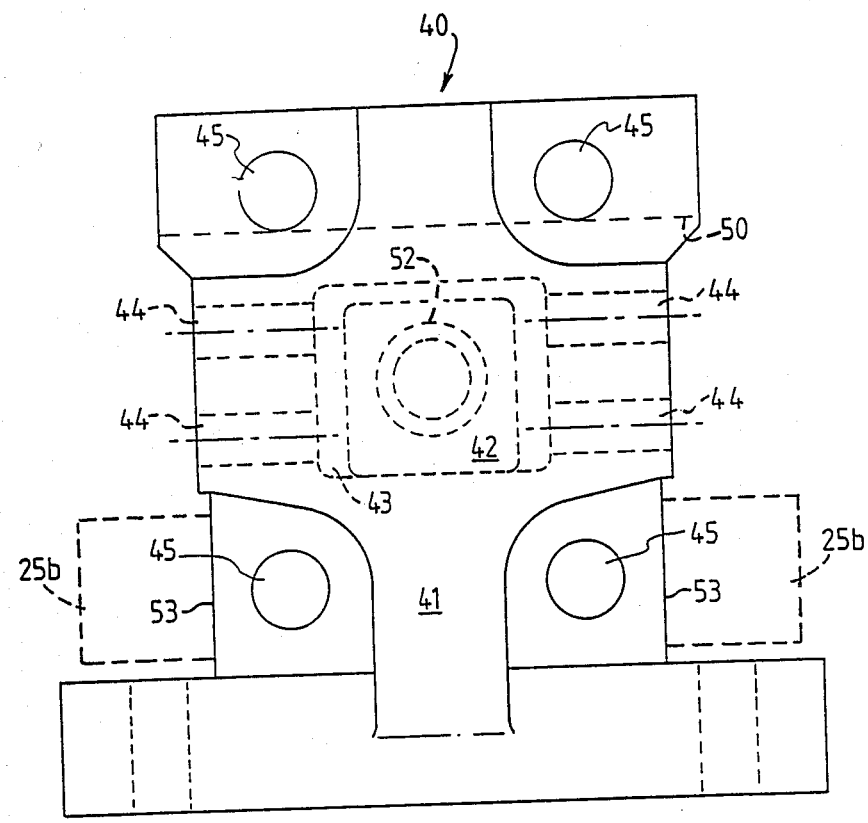
FIG. 3 is a plan view of a suspension component assembly according to an embodiment of the invention.
Figure 4:
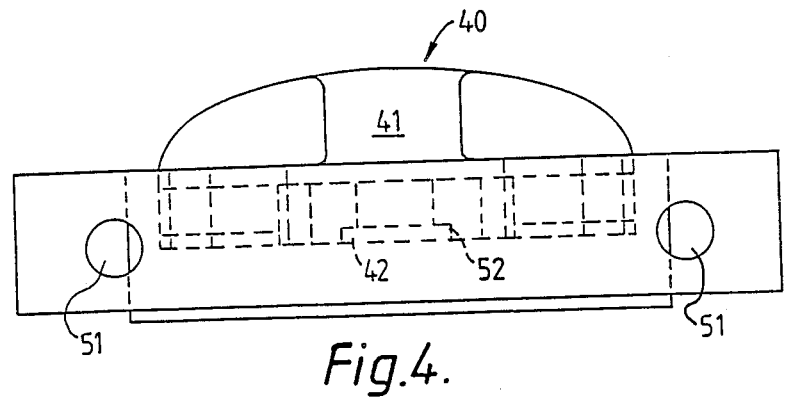
FIG. 4 is a side view of the component assembly of FIG. 3.

FIG. 3 is a plan view of a suspension component assembly according to the invention. The assembly 40 includes a top plate 41 and an alignment member in the form of an alignment plate 42. Plate 42 is received within a recess 43 on the underside of the top plate. On opposed sides of the recess two pairs of threaded passages 44 are provided for receiving adjustment fasteners (not shown). These fasteners can be adjusted to selectively locate plate 42 within the recess 43. Passages 44, in use, would extend substantially along and parallel to the longitudinal axis of a vehicle to which the assembly is fitted. Apertures 45 extending through the top plate enable the top plate to be secured relative to a spring saddle (like that indicated by numeral 25 in FIG. 2) with a spring assembly clamped between the top plate and saddle.

The top plate 41 has a shoulder 50 and two threaded apertures 51 opposed to the shoulder and which in use extend transversely of the vehicle. The spring assembly or rather the uppermost leaf thereof would in use locate between the shoulder 50 and back 25b of a saddle (shown in FIG. 1 and in broken outline in FIG. 3) with back 25b having portions locating against machined edges 53. By tightening of the top plate fasteners (not shown) which are received in apertures 51 the spring assembly is clamped against the shoulder 50 and between the shoulder and saddle back 25b. Plate 42 has an aperture 52 for accurately receiving the upstanding nib projecting from the uppermost leaf of the spring assembly. By locating the top plate in this way relative to the saddle for and aft movement of the top plate is prevented.

In use the assembly 40 may be employed with one or both sides of the vehicle suspension assembly to locate the spring saddle and thus walking beam assembly relative to the spring assembly. Where only one assembly 40 is used a conventional top plate may be employed on the opposite side of the vehicle.

To position the suspension component assembly 40 plate 42 is located over the nib of the spring assembly and plate 42 is located within recess 43. The fasteners which locate in transverse apertures 51 are tightened to position the spring assembly against the shoulder 50 and transverse clearance between the plate 42 and recess 43 allows for this transverse movement. The fasteners which pass through passages 44 are adjusted to align or located the top plate 41 and hence saddle and beam assemblies 25 and 24 in the desired position (that is, so that the axles are square to the longitudinal axis of the vehicle). The fasteners which pass through apertures 45 are then tightened to clamp the spring assembly in that position between the top plate 41 and the saddle. As mentioned previously, a centre bolt extends through the spring assembly. The head of the centre bolt is received within a recess with considerable clearance in the saddle. No location is normally effected at this location. However, depending upon the amount of adjustment desired between the spring and the saddle, it may be necessary to provide for greater clearance between the head and the recess. In the preferred application, adjustment of approximately ±10 mm /m (i.e. 0.17°) will be available without any change in the clearance between the centre bolt head and recess.

The suspension component assembly of the invention enables out of squareness adjustment of the axles to be achieved remote from components, the replacement of which would not normally require re-alignment of the axles. Thus the replacement of those components during servicing does not affect the adjustment of the assembly of the invention.

That is, by having adjustment provided remote from the walking beam bushes, the replacement of these bushes during servicing would not normally require axle re-alignment for squareness.

Servicing of the spring assembly normally requires re-alignment of the axles and the suspension component assembly of the invention enables this to be done during that servicing. Realignment should be a necessary operation following such service regardless of whether or not the assembly of the invention was fitted to the suspension.

The invention enables adjustment to be carried out where misalignment problems normally occur and without requiring bending of axles or without introducing further potential misalignment between the axles.

The assembly of the invention does not introduce the need for an additional operation as a consequence of being able to provide for adjustment for squareness correction.

What I claim is:

1. A suspension component assembly for a vehicle suspension including a top plate assembly for mounting relative to a spring assembly and saddle, said top plate assembly having a top plate and an alignment member having locating means for accurate alignment with a nib of the spring assembly, said top plate having a slot or a recess on its underside for receiving the alignment member, the recess allowing movement of the alignment member to adjust for squareness of the suspension and adjustment means associated with the top plate for locating and holding the alignment member at a desired location relative to the recess.

2. The suspension assembly of claim 1 wherein the top plate includes a shoulder on its underside against which the spring assembly may be held.

3. The suspension assembly of claim 2 wherein the top plate has threaded apertures opposed to said shoulder for receiving fasteners and said fasteners hold the spring assembly against said shoulder.

4. The suspension component assembly of claim 1 wherein said recess is rectangular in shape and allows for movement of said alignment member in a first direction substantially longitudinally of a vehicle to which the spring assembly may be mounted and in a second direction substantially transverse of the vehicle.

5. The suspension component assembly of claim 4 wherein said adjustment means enables adjustment and selective location of said alignment member along the first direction to adjust for squareness of vehicle axles relative to a longitudianl direction of the vehicle.

6. The suspension component assembly of claim 5 wherein said adjustment means comprises a plurality of fasteners extending into respective bores into the tap plate, said bores being aligned along the first direction whereby adjustment of the fasteners enables adjustment and selective location of the member in the recess along the first direction.

7. The suspension component assembly of claim 6 wherein the fasteners and respective bores are arranged in two opposed pairs and extending into the top plate and into the recess.

8. The suspension component assembly of claim 1 including apertures for receiving fasteners to enable a spring assembly to be held between the top plate and a saddle.

9. The suspension component assembly of claim 1 wherein said alignment member consists of an alignment plate and said locating means consist of a nib-receiving recess in the plate.

10. The suspension component assembly of claim 9 wherein said plate is substantially square in peripheral shape.

11. The suspension component assembly of claim 6 wherein said plate is substantially rectangular in peripheral shape.

* * * * *